United States Patent [19]
Breed et al.

[11] 3,974,717
[45] Aug. 17, 1976

[54] FOUR PINION DIFFERENTIAL

[75] Inventors: Michal A. Breed, Greenfield; James E. Marsch, Brookfield, both of Wis.

[73] Assignee: Allis-Chalmers Corporation, Milwaukee, Wis.

[22] Filed: Dec. 19, 1974

[21] Appl. No.: 534,554

[52] U.S. Cl. .................................. 74/713; 74/710.5
[51] Int. Cl.² ...................... F16H 1/40; F16H 1/44
[58] Field of Search ................ 74/710, 710.5, 711, 74/713

[56] References Cited
UNITED STATES PATENTS

| | | | |
|---|---|---|---|
| 1,185,174 | 5/1916 | Brush | 74/713 |
| 1,461,102 | 7/1923 | Sternbergh | 74/713 |
| 1,469,190 | 9/1923 | Ormsby | 74/710.5 |
| 1,938,457 | 12/1933 | McCaffery | 74/711 |
| 2,720,797 | 10/1955 | Huddleston et al. | 74/713 |
| 2,971,404 | 2/1961 | Thornton | 74/711 |
| 2,985,035 | 5/1961 | Toth | 74/711 |
| 3,292,720 | 12/1966 | Harvey | 74/710.5 X |
| 3,546,968 | 12/1970 | Altmann | 74/710.5 |
| 3,593,595 | 7/1971 | Taylor | 74/713 |
| 3,874,251 | 4/1975 | Lapitsky et al. | 74/710 X |

*Primary Examiner*—Samuel Scott
*Assistant Examiner*—Lance W. Chandler
*Attorney, Agent, or Firm*—Arthur L. Nelson

[57] ABSTRACT

A four pinion differential with a one-piece housing and a differential lock to lock the differential for synchronous rotation of the side gears or differential rotation of the side gears. The pinion gears of the differential are mounted on a cross shaft and a pair of stub shafts which are retained in nonrotating position by a locking bolt extending through the stub shafts to lock the stub shafts in recesses on the cross shaft.

10 Claims, 3 Drawing Figures

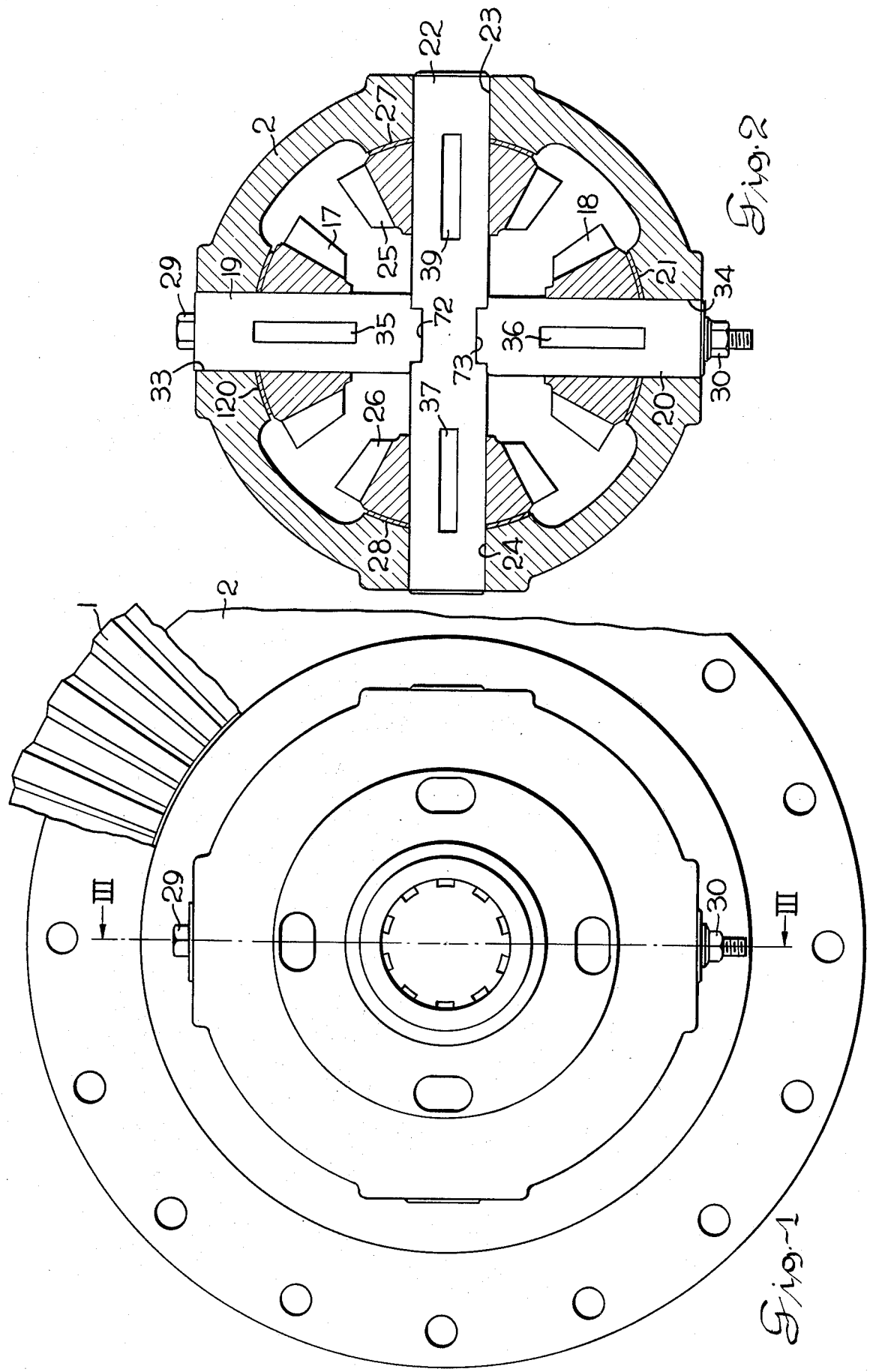

FOUR PINION DIFFERENTIAL

This invention relates to the vehicle differential and more particularly to a four pinion differential having a one-piece housing with a cross shaft and two stub shafts for mounting the pinion gears. A locking bolt locks the stub shafts and cross shaft nonrotatably in the differential housing to provide bearing support for the pinion gears.

A vehicle differential is used in the drive train to provide differential rotation of the drive axles to accommodate turning of the vehicle. The differential is often provided with a locking means to lock the differential to cause synchronous rotation of the drive axles to overcome slippage on one of the drive wheels to assure that there is continuous drive for the vehicle at least on the one wheel which has traction.

Conventional differentials have employed a two-piece housing to facilitate assembling of the pinion shafts in the differential. A pair of pinion gears is adequate in many instances for driving of the vehicle. In heavy-duty drive, however, a four pinion gear differential is more satisfactory since it will transmit greater torque with less strain on the differential. A one-piece housing differential does not cause any real problem in mounting of two pinion gears, however, the mounting of four pinion gears in a one-piece housing can be somewhat more complex. Accordingly, this invention provides for a one-piece housing and a four pinion gear differential. A cross shaft and two stub shafts provide the mounting means for the pinion gears. A locking bolt extending through the stub shafts and transversely through the cross shaft lock the pinion shafts in a nonrotatable position in the housing.

It is an object of this invention to provide a four pinion gear differential with a unitary housing.

It is another object of this invention to provide a four pinion differential with a cross shaft and stub shafts bolted together in the one-piece differential housing for mounting the pinion gears.

It is a further object of this invention to provide a four pinion gear differential with pinion shafts supported in a one-piece housing and centrally fastened by a bolt extending through the pinion shaft.

The objects of this invention are accomplished by providing a one-piece differential housing carrying a ring gear. A cover plate is bolted to the end of the one-piece housing which carries a hydraulic actuator and clutch for selectively engaging the clutch for locking the housing with one of the side gears. The four pinion gears engaging the side gears are mounted on a cross shaft diametrically positioned in the differential housing and stub shafts engaging the center portion of said cross shaft with a bolt for locking. The locking bolt locks the pinion shafts nonrotatably in the one-piece housing of the differential.

The preferred embodiments of this invention are illustrated in the attached drawings.

FIG. 1 is a side elevation view of the differential with a portion of the ring gear;

FIG. 2 is a cross section view taken on line II—II of FIG. 3; and

Figure 3:
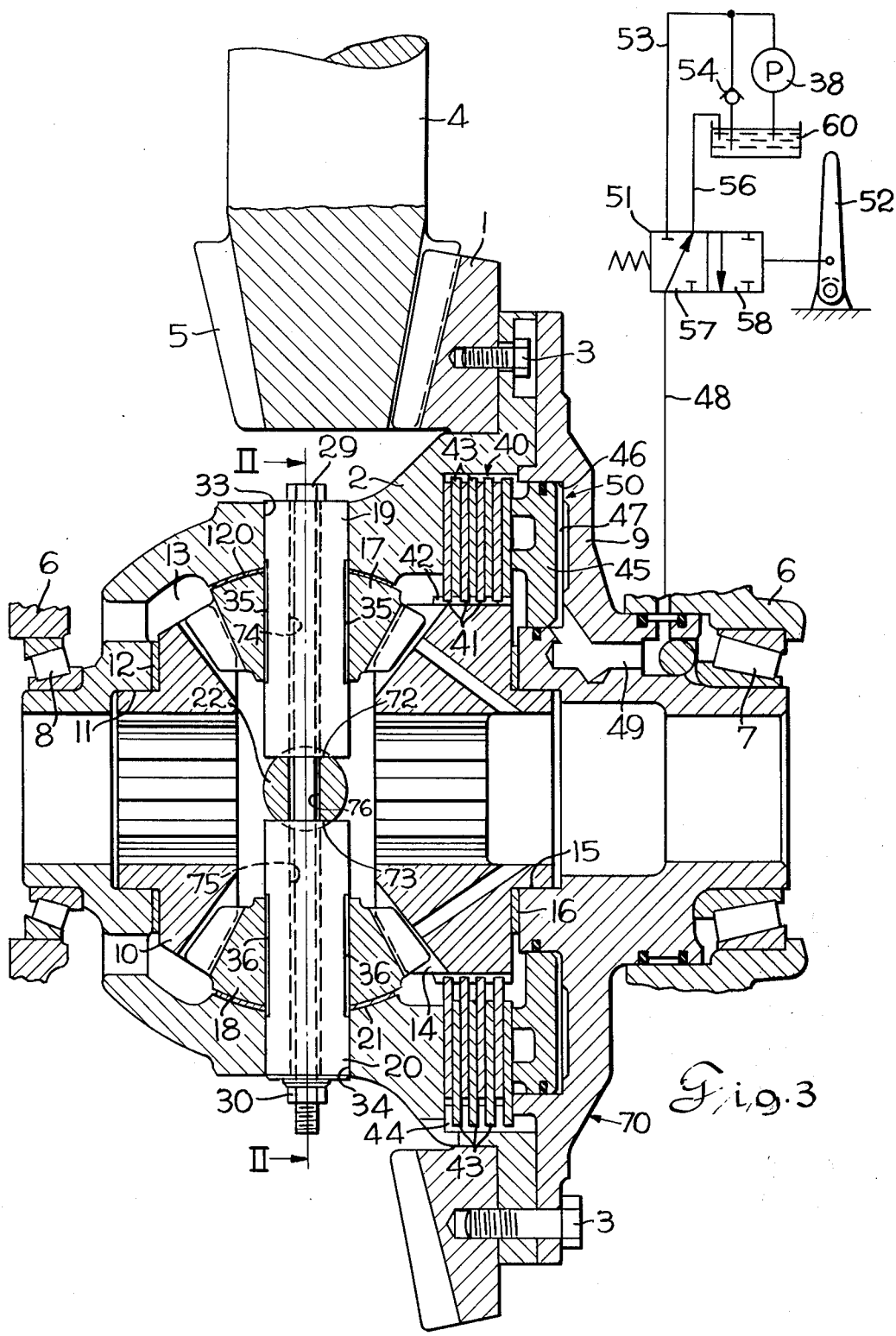
FIG. 3 is a cross section view taken on line III—III of FIG. 1 showing the propeller shaft and a schematic hydraulic system.

Referring to the drawings, FIG. 1 illustrates a side view of the differential. The ring gear 1 is mounted on a housing 2. The ring gear 1 is fastened by a plurality of bolts 3 as shown in FIG. 3. The propeller shaft 4 is connected to the drive pinion 5 which drives a ring gear 1. A rear axle housing 6 supports the differential bearing assemblies 7 and 8 which embrace the differential housing 2 and the cover plate 9. The side gear 10 is rotatably supported in the opening 11 and is seated against the thrust washer 12 in the gear chamber 13.

The side gear 14 is journalled in the opening 15 and bears against the thrust washer 16 in the cover plate 9. The pinion gears 17 and 18 engage the side gears 10 and 14. The pinion gear 17 is mounted on the stub shaft 19 and is seated on the thrust washer 120. The stub shaft 19 is received within the opening 33 while the stub shaft 20 is received within the opening 34. The pinion gear 18 is rotatably mounted on the stub shaft 20 and seats against the thrust washer 21.

FIG. 2 shows the cross shaft 22 received within the openings 23 and 24 and carrying the pinion gear 25 and 26. The pinion gear 25 engages the thrust washer 27 while the pinion gear 26 engages the thrust washer 28. The locking bolt 29 and nut 30 fasten the stub shafts 19 and 20 to the cross shaft 22 and firmly lock the shafts in nonrotating positions in the housing 2.

The stub shaft 19 is provided with flat surfaces 35 and the stub shaft 20 is provided with the flat surfaces 36. Similar flats 37 and 39 are provided on the cross shaft 22. These flats are provided to aid lubrication of the pinion shafts and the pinion gears.

The differential also includes a clutch 40 and hydraulic actuator 50. The clutch 40 includes the clutch discs 41 mounted on the spline 42 of the side gear 14. The clutch discs 43 are also retained in slots 44 of the housing 2. The clutch discs 41 and 43 are compressed by the piston 45. The piston 45 reciprocates within the cylinder 46 forming the pressurizing chamber 47. Pressurizing chamber 47 is in communication with the conduit 48 through the passage 49.

The conduit 48 in communication with the passage 49 is connected to the control valve 51. The control valve 51 is operated by the control lever 52. The pump 38 receives fluid from the reservoir 60 and pressurizes fluid in the conduit 53. The check valve 54 returns fluid to the reservoir when pressure is above a predetermined pressure. The conduit 56 returns fluid from the hydraulic actuator 50 when the clutch 40 is released.

The control valve 51 includes two sections. Section 57 permits fluid flow from the pressurizing chamber 47 to the reservoir 60. The section 58 provides for supplying pressurized fluids from the pump 38 through the conduits 53 and 48 to actuate the clutch 40.

The operation of the differential will be described in the following paragraphs.

The differential 70 is rotatably mounted in the rear drive shaft housing 6. The propeller shaft 4 carrying the drive pinion 5 drives the ring gear 1 for rotation about a common axis of rotation with the side gears 10 and 14. When the differential is locked by engaging the clutch 40 the side gears 10 and 14 rotate synchronously. Locking of the differential is accomplished by positioning the section 58 of the control valve 51 in engagement to supply pressurized fluid from the pump 38 to pressurize fluid in the pressurizing chamber 47 and compress the disc stack 41 and 43 and engage the clutch.

The clutch 40 is released when section 57 is positioned by the control lever 52 for release of the pressurized fluid in the pressurizing chamber 47. The release of the pressurized fluid is permitted to flow into the reservoir 60. A suitable detent mechanism is provided to selectively position the control valve 51 for operation through section 57 or section 58.

The differential is a four pinion differential having a one-piece housing for supporting the shafts 19, 20 and 22. The stub shafts 19 and 20 are positioned in the recesses 72 and 73 of the cross shaft 22. The recesses 72 and 73 and the mating inner ends of the shafts 19 and 20 are such that the cross shaft 22 and stub shafts 19 and 20 are nonrotatably fastened in the housing 2. The locking bolt 29 and the nut 30 extend through the openings 72 and 75 of the stub shafts 19 and 20. The bolt 29 also extends through the transverse opening 76 of the cross shaft 22. Tightening of the bolt 29 and nut 30 locks the stub shafts 19 and 20 on the cross shaft 22 so that neither shaft can move axially relative to each other. Accordingly, the shafts form a nonrotatable support for pinions of the differential.

The embodiments of the invention in which an exclusive property or privilege is claimed are defined as follows:

1. A differential for use on a vehicle comprising a one piece differential housing defining pinion shaft openings extending radially through said housing and a bearing surface for rotatably supporting said housing on one end, a coverplate fastened to the end of said housing defining a bearing surface for rotatably supporting said plate and housing, a ring gear fastened to said differential housing adapted for being driven by a drive pinion, a pair of side gears in said housing rotating on a common axis of rotation with said ring gear and differential, a plurality of pinion gears in said housing engaging said side gears, an integral shaft structure including, pinion shafts including a cross shaft extending diametrically through two of the openings in said housing supporting a pair of said pinion gears, a pair of stub shafts fixedly engaging the center of said cross shaft and extending radially from said cross shaft through two other of the opening in said housing and supporting a second pair of pinion gears, a bolt extending axially through said stub shafts and diametrically through said cross shaft locking said cross shaft axially and retaining said shafts in fixed non-rotating positions in said housing thereby defining an integral shaft structure.

2. A differential for use on a vehicle as set forth in claim 1, wherein said cross shaft defines a diametrical shaft extending completely through said differential housing, said stub shafts define radial shafts extending radially from said cross shaft through said housing.

3. A differential for use on a vehicle as set forth in claim 1, wherein said stub shafts define central openings extending through said shafts for receiving said bolt for fastening said stub shafts to said cross shaft.

4. A differential for use on a vehicle as set forth in claim 1 wherein said cross shaft defines notched recesses on its central portion adapted for receiving complementary portions of said stub shafts for seating said stub shafts on said cross shaft.

5. A differential for use on a vehicle as set forth in claim 1 wherein said differential includes said cover plate connected to said housing and ring gear for rotatably supporting one end of said differential.

6. A differential for use on a vehicle as set forth in claim 1 wherein said differential includes said cover plate defining a hydraulic actuator, a clutch including clutch discs alternately connected to said housing and one at said side gears with said clutch selectively engaged by said actuator for operating said differential for synchronous rotation of the side gears or differential rotation of said side gears.

7. A differential for use on a vehicle as set forth in claim 1 wherein said stub shafts define axially aligned openings, said bolt received in said opening for fastening said stub shafts to said cross shaft for locking said shafts in a fixed position in said differential housing.

8. A differential for use on a vehicle as set forth in claim 1 wherein said cross shaft defines transverse notches, each of said stub shafts defines mating end portion received in said transverse notches.

9. A differential for use on a vehicle as set forth in claim 1 wherein said housing defines embossments on the internal and external portion of said housing around said openings to increase the axial support of said stub shafts and said cross shaft.

10. A differential for use on a vehicle as set forth in claim 1 wherein said cross shaft defines recess means, complementary means on said stub shafts for engaging said recess means on said cross shaft, said bolt extending axially through said stub shafts and laterally through said cross shaft for fixing said shafts to prevent any movement of said shafts relative to said differential housing.

* * * * *